United States Patent [19]
Bylinsky et al.

[11] 4,283,763
[45] Aug. 11, 1981

[54] SYSTEM FOR GRAPHIC REPRESENTATION OF VESSEL'S POSITION ON MERCATOR MAP

[76] Inventors: Lev V. Bylinsky, Pervomaisky prospekt, 46/1, kv. 14; Vladimir I. Gavrilenko, ulitsa Ostrovskogo, 24, korpus 1, kv. 35, both of Ryazan; Ivan F. Glumov, ulitsa Kotovskogo, 11, kv. 59, Gelendzhik Krasnodarskogo kraya; Vasily F. Denisov, ulitsa Internatskaya, 1; Vadim V. Meer, ulitsa Poletaeva, 32, kv. 42, both of Ryazan, all of U.S.S.R.

[21] Appl. No.: 75,337

[22] Filed: Sep. 13, 1979

[51] Int. Cl.$^3$ ............................................. G01C 21/22
[52] U.S. Cl. ............................. 364/449; 343/112 PT; 340/24
[58] Field of Search ............................ 364/443–444, 364/449, 450; 343/112 C, 112 PT; 340/24, 27 NA; 73/178 R

[56] References Cited

U.S. PATENT DOCUMENTS

| | | |
|---|---|---|
| 3,366,959 | 6/1968 | Roberts .................. 343/112 PT |
| 3,392,448 | 7/1968 | Rock ........................... 340/24 |
| 3,475,754 | 10/1969 | Scovill ...................... 364/449 |
| 3,652,836 | 3/1972 | Richardson et al. ......... 343/112 C |
| 3,725,919 | 4/1973 | Jones et al. .............. 343/112 PT |
| 3,849,636 | 11/1974 | Helms ........................ 340/24 |
| 3,967,098 | 6/1976 | Harnagel et al. ......... 340/27 NA |
| 4,086,632 | 4/1978 | Lions .......................... 364/444 |
| 4,155,085 | 5/1979 | Warnock et al. ......... 343/112 PT |
| 4,192,002 | 3/1980 | Draper ........................ 340/24 |

OTHER PUBLICATIONS

Ponikarovsky and Glebov, "Ship's Navigation Instruments", the Publishing House of the Navy Hydrographic Service Chief's Department, 1957, pp. 242–244.
Itenberg et al., "Logs and Automatic Reconers", Leningrad, 1964, pp. 462–465.

*Primary Examiner*—Mark E. Nusbaum
*Assistant Examiner*—Gary Chin
*Attorney, Agent, or Firm*—Lackenbach, Lilling & Siegel

[57] ABSTRACT

A system for graphic representation of a vessel's position on the Mercator map, comprising a velocity and drift angle sensor and a heading sensor which are connected to a computer to compute the longitudinal and latitudinal velocity components. The computer has its outputs connected to respective binary multipliers which, in turn, are connected via a storage to a nonlinear converter and, via respective circuits incorporating frequency dividers, to integrating drives of a plotter intended to indicate the position of the vessel on the Mercator map. The nonlinear converter is intended to reproduce electric signals in the form of trigonometric functions and has its correction input connected to an output of an approximator of the correction for the meridional minute length at the location of the vessel. An information input of the nonlinear converter is connected to an output of an adder. An input of the approximator is connected to an output of a unit for successively setting the standard parallel latitude and the latitude of the initial location of the vessel. The frequency divider circuits are connected to a unit for setting the standard parallel scale of the Mercator map.

4 Claims, 4 Drawing Figures

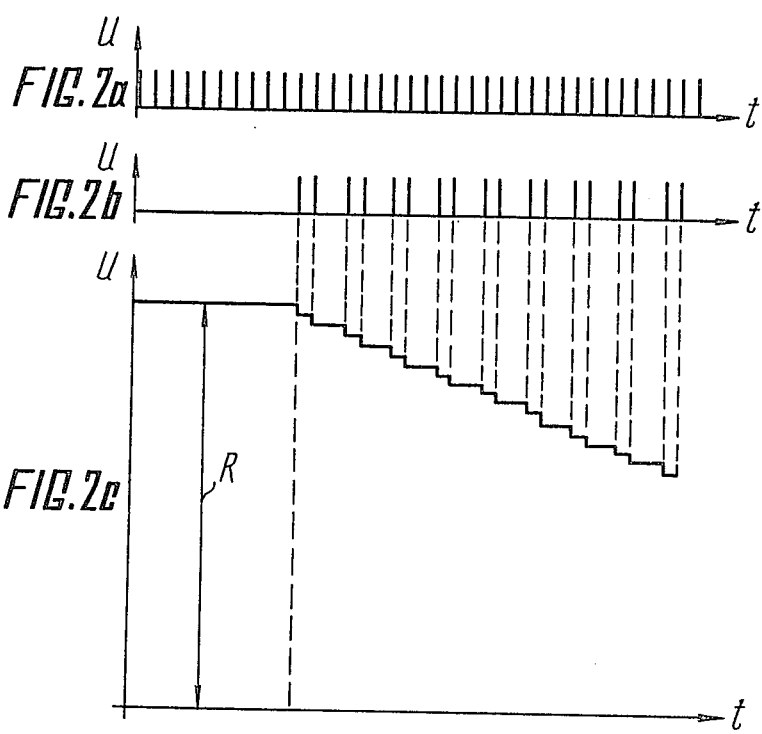

SYSTEM FOR GRAPHIC REPRESENTATION OF VESSEL'S POSITION ON MERCATOR MAP

FIELD OF THE INVENTION

The present invention relates to navigation systems and, more particularly, to a system for graphic representation of a vessel's position on the Mercator map.

The system according to the invention is chiefly used for continuous graphic representation of a vessel's position on the Mercator map, while carrying out geophysical research in shelf areas where a high accuracy of navigation is a must. The system is also applicable to autonomous navigation in high latitudes.

BACKGROUND OF THE INVENTION

The finding of the position of a geophysical research vessel must be highly accurate so as to ensure proper correlation between anomalies observed in the earth's crust on the one hand and the available data on the earth's crust in the area under investigation and cartographic depth information on the other hand. In the case of shelf exploration, the permissible position finding error must not be in excess of a few meters, otherwise subsequent prospecting drilling will only result in a loss of time and money. However, the existing systems for graphic representation of a vessel's position on the map are such that, even with an accurate course and speed determination, the position finding error amounts to as high as 1 to 1.5 percent of the distance covered by the vessel. The error is too big, of course, and is largely due to errors involved in the automatic scale conversion of coordinates from the Descartes system, in which the longitudinal and latitudinal speed components are determined, to the Mercator map projection.

DESCRIPTION OF THE PRIOR ART

A system is known for graphic representation of a vessel's position on the Mercator map (cf. S. I. Itenberg et al., "Laghi i avtoschisliteli. Kurs korablevozhdeniya"/"Logs and Automatic Course Computers. Lessons in Navigation"/, vol. V, Book 3, published by the Navy's Hydrograpic Service, Leningrad, 1964, pp. 464-465), which comprises, in a series arrangement, a device for calculating longitudinal and latitudinal distances covered by the vessel, a scaling device and a position tracer board. The scaling device serves to multiply the secant of the actual latitude by the equatorial scale. The equatorial scale is calculated by the navigator and is the relationship between the standard parallel and its latitude secant. The scaling device comprises, in a series arrangement, a first converter of the actual latitude to the logarithm of its secant and a unit for taking the logarithm of the equatorial scale denominator, complete with a setter. Outputs of the converter and logarithm taking unit are connected to a signal subtraction unit connected to a second converter which serves to take antilogarithms from the difference. The system is built around of analog-type electromechanical elements.

The system under review is such that the equatorial scale denominator may have many values, including fractional values which are difficult to accurately set because of the limited resolution of the analog setter of that denominator. The scale deonominator has to be rounded off; this accounts for an error which is especially pronounced in high latitudes where there is a sharp increase in the conversion transconductance of the second converter. The system under review is further disadvantageous in that the logarithm taking unit, the signal subtraction unit and the second converter are placed in series, thereby causing the errors of these units to be added up to affect the performance of the scaling device as a whole.

There is also known a system for graphic representation of a vessel's position on the Mercator map, comprising a velocity and drift angle sensor and a heading sensor which are connected to a computer of the longitudinal and latitudinal velocity components, at whose outputs there are produced electric signals corresponding to the longitudinal and latitudinal speeds of the vessel. The outputs of the computer are connected to inputs of respective multipliers whose outputs, in turn, are electrically coupled to inputs of integrating drives of a plotter intended to indicate the position of the vessel on the Mercator map. The remaining inputs of the multipliers are interconnected and coupled to a unit for setting the standard parallel scale of the Mercator map and to an output of a nonlinear converter intended to reproduce electric signals in the form of trigonometric functions of the latitude. The nonlinear converter has its information input connected to an output of an adder having a first input connected to an output of a unit for successively setting the latitude of the standard parallel and the latitude of the initial location of the vessel; a second input of the adder is connected to that output of the longitudinal and latitudinal velocity components computer whose signal is related to the longitudinal, or meridional, speed of the vessel (cf. G. N. Ponikarovsky, E. P. Glebov, "Korabelnye navigatsionnye pribory"/'-'Marine Navigation Instruments"/, published by the Navy's Hydrographic Service, 1957, pp. 234-250).

In this system, the latitude setting unit comprises, in fact, two setters one of which serves to introduce the latitude of the standard parallel, while the other is intended to introduce the latitude of the initial location of the vessel. The nonlinear converter reproduces the function of three independent variables and comprises two functional units placed in series. One of these units has its inputs connected to the latitude setters and the unit for setting the scale of the standard parallel; it serves to divide the standard parallel scale by the secant of its latitude. The second unit serves to multiply the result of the division by the secant of the actual latitude, produced by the adder. The first input of the adder is connected to the unit for setting the latitude of the vessel's initial position; the second input of the adder is connected to that output of the computer which is related to the meridional velocity component. All the units of the system are built of analog-type electromechanical elements.

In the foregoing system, the standard parallel scale is a series of standard values, such as 1/10000, 1/5000, etc. Thus the denominator is an accurately specified round number. However, the system under review shows a serious scale conversion error. This is due to the fact that the individual units of the nonlinear converter are placed in series and thus reproduce the function of the latitude secant with unlimited increments. The effects of the initial errors are proportional to the derviative of the latitude secant. The series arrangement of the functional units also accounts for the fact that the errors of all these units are added up.

Besides, the system under review is such that while carrying out scale conversion, it does not take into account the real change in the length of the meridional minute, which change occurs because the earth is not ideally spherical. This leads to an additional error of +0.5 percent of the distance covered by the vessel.

SUMMARY OF THE INVENTION

It is an object of the present invention to provide a system for graphic representation of a vessel's position on the Mercator map, which would improve the position finding accuracy in high latitudes.

The foregoing object is attained by providing a system for graphic representation of a vessel's position on the Mercator map, comprising a velocity and drift angle sensor and a heading sensor which are connected to a computer which computes the longitudinal and latitudinal velocity components and at whose outputs there are produced electric signals corresponding to the longitudinal and latitudinal velocity of the vessel. The outputs of the computer are connected to inputs of respective multipliers having their outputs electrically coupled to inputs of integrating drives of a plotter intended to indicate the position of the vessel on the Mercator map. Other inputs of the multipliers are interconnected and coupled to a unit for setting the scale of the standard parallel of the Mercator map and to an output of a nonlinear converter intended to reproduce an electric signal in the form of trigonometric latitude functions. The information input of the nonlinear converter is connected to an output of an adder having a first input connected to an output of a unit for successively setting the latitude of the standard parallel and the latitude of the initial location of the vessel. The second input of the adder is connected to that output of the computer of the longitudinal and latitudinal velocity components whose signal corresponds to the meridional velocity of the vessel. The system being characterized, according to the invention, in that it includes a storage through which the multipliers are connected to the nonlinear converter for the reproduction of an electrical signal on the form of a trigonometric function of the latitude. An approximator for the correction of the meridional minute length at the location of the vessel has its input connected to the output of the unit for successively setting the latitude of the standard parallel and the latitude of the initial location of the vessel, its output being connected to a correction input of the nonlinear converter. Also included are two circuits, each comprising two series connected frequency dividers with a controlled division coefficient, an information input of each of said circuits being connected to the output of a respective multiplier, an output of each of said two circuits being connected to the input of a respective integrating drive of the plotter, control inputs of the first frequency dividers of the two circuits being combined and connected to a digital output of the nonlinear converter, and control inputs of the second frequency dividers of the two circuits being combined and connected to the output of the unit for setting the scale of the standard parallel of the Mercator map.

It is expedient that the nonlinear converter should comprise two digital integrators, one integrator having its summing input connected to a pulse output of the second integrator. An OR gate has a first input connected to a pulse output of the first digital integrator, a second input serving as the correction input of the nonlinear converter and an output connected to a subtraction input of the second digital integrator. Count inputs of both digital integrators are combined, their common point of connection serving as the information input of the nonlinear converter. A register output of the second integrator serves as a digital output of the nonlinear converter.

It is expedient that the approximator of the correction for the meridional minute length should include an AND gate having one of its inputs serve as the input of the approximator, as well as a series circuit composed of a counter, whose input is connected to the first input of the AND gate, a decoder and an OR gate, whose output is connected to the second input of the AND gate.

It is desirable that the plotter should include a picture frame to hold the Mercator map on the board, a magnetically conducting plate secured on the board under the Mercator map, and at least three electromagnetic holdfast means arranged on the picture frame. The size of the frame along the latitude coordinate $\psi$ is to be 0.25 to $\frac{2}{3}$ of the Mercator map sheet length; it is further expedient that the integrating drives should be reversible step electromotors rigidly mounted on the picture frame and conncted to the outputs of the respective frequency divider circuits; the inputs of the reversible step motors are to receive a train of pulses arriving at a frequency corresponding to the product of longitudinal and latitudinal vessel speed components and the actual scale of the Mercator map with the correction for the asphericity of the earth taken into account; a signal carrying information on the magnitude of the correction is to be formed by the approximator.

The invention provides for improved accuracy of the scale conversion and representation of the vessel's position on the Mercator map. This is due to the fact that the nonlinear converter is built of digital integrators and that its digital output is connected to the control inputs of the first frequency dividers and, via the storage, to the inputs of the multipliers; this is also due to the fact that the standard parallel setting unit is connected to the control inputs of the second frequency dividers. According to the invention, the nonlinear converter performs trigonometrical transformation with a limited modulus of the derivative of two close values, i.e. the standard parallel latitude and the latitude of the initial position of the vessel, which is followed by reproducing the ratio between the cosines of these latitudes, which are produced by the nonlinear converter on the basis of the information supplied by the successive latitude setting unit.

The position finding error is further reduced, especially in high latitudes, by introducing the approximator of the correction for the meridional minute length in combination with the plotter of the above-mentioned design.

BRIEF DESCRIPTION OF THE DRAWINGS

Other objects and advantages of the present invention will become more apparent from a consideration of the following detailed description of a preferred embodiment thereof, taken in conjunction with the accompanying drawings, wherein:

FIGS. 2a, 2b and 2c are time plots of voltages at the inputs and outputs of the components incorporated in the system according to the invention.

DETAILED DESCRIPTION OF THE INVENTION

Figure 1:
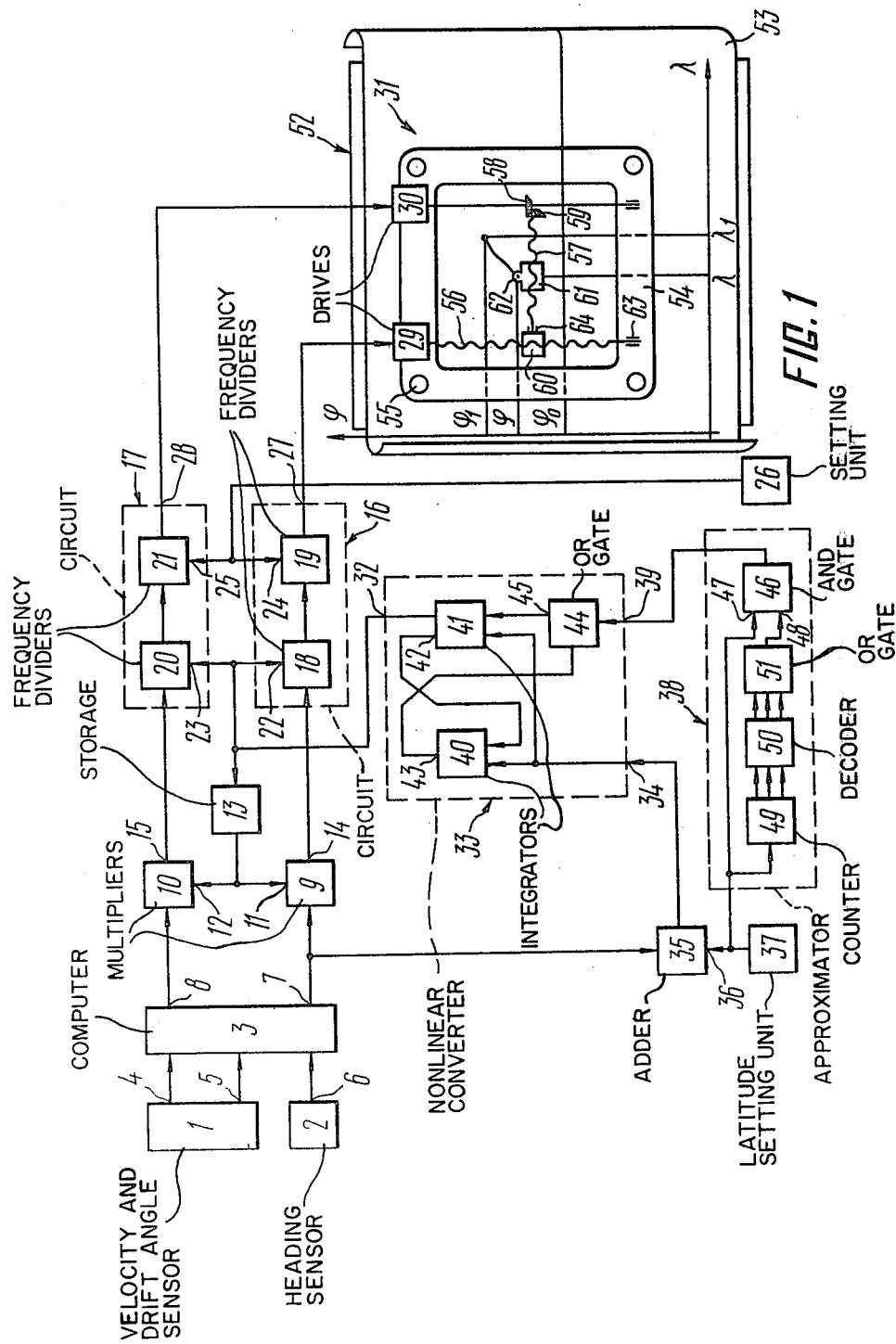
FIG. 1 is a block diagram of a system for graphic representation of a vessel's position on the Mercator map, in accordance with the invention.

Referring now to the attached drawings, the system according to the invention for graphic representation of a vessel's position on the Mercator map comprises a velocity and drift angle sensor 1 (FIG. 1) and a heading sensor 2 which are connected to a computer 3 which computes the longitudinal and latitudinal velocity components. In the embodiment under review, the sensor 1 is a hydroacoustical Doppler log; from an output 4 of the sensor 1 to an input of the computer 3 there is applied an electric signal corresponding to the vessel speed vector V; from an output 5 there arrives an electric signal corresponding to the drift angle $\beta$. The sensor 2 is a gyro-compass with a digital output 6 from which to the input of the computer 3 there is applied an electric signal proportional to the course K of the vessel.

In the embodiment under review, the computer 3 is of a generally known type, being built of a digital differential analyzer having outputs 7 and 8 at which there are produced electric signals which are pulses having a repetition frequency corresponding to the longitudinal and latitudinal velocity components. The outputs 7 and 8 are connected to inputs of respective binary multipliers 9 and 10.

Second inputs 11 and 12 of the binary multipliers 9 and 10, respectively, are interconnected, their point of connection being coupled to an output of a storage 13 which is a register. Outputs 14 and 15 of the binary multipliers 9 and 10, respectively, are connected to information inputs of circuits 16 and 17. The circuit 16 comprises two frequency dividers 18 and 19, which are placed in series. The circuit 17 comprises two frequency dividers 20 and 21, also placed in series. The frequency dividers 18, 19, 20 and 21 all have a controlled division coefficient. Control inputs 22 and 23 of the first frequency dividers 18 and 20, respectively, are combined and connected to an input of the storage 13. Control inputs 24 and 25 of the second frequency dividers 19 and 21, respectively, are also combined and connected to an output of a digital unit 26 for setting the standard parallel scale of the Mercator map. In the embodiment under review, the setting unit 26 is of a well-known type that comprises a switch and a register. Outputs 27 and 28 of the circuits 16 and 17, respectively, are connected to inputs of integrating drives 29 and 30, respectively, of a plotter 31 which serves to indicate the position of the vessel on the Mercator map.

The storage 13 has its input connected to an output 32 of a nonlinear converter 33 intended to reproduce an electric signal in the form of trigonometric latitude functions. An information input 34 of the nonlinear converter 33 is connected to an output of an adder 35 built of an OR gate. A first input of the adder 35 is connected to the output 7 of the computer 3. A second input 36 of the adder 35 is connected to an output of a unit 37 for successively setting the latitude of the standard parallel and the latitude of the initial position of the vessel. In the embodiment under review, the unit 37 is a subtract counter whose set inputs are so controlled by a switch that the number of pulses produced by said unit 37 corresponds to the setting of the switch.

The output of the unit 37 is connected to an approximator 38 of the correction for the meridional minute length at the location of the vessel. An output of the approximator 38 is connected to a correction input 39 of the nonlinear converter 33.

The nonlinear converter 33 is intended to reproduce an electric signal in the form of trigonometric latitude functions. It comprises two digital integrators 40 and 41. A summing input of the integrator 40 is connected to a pulse output 42 of the integrator 41. A pulse output 43 of the integrator 40 is connected to a first input of an OR gate 44. A second input of the OR gate 44 serves as the correction input 39 of the nonlinear converter 33. An output 45 of the OR gate 44 is connected to a subtract input of the digital integrator 41. Count inputs of the integrators 40 and 41 are combined and their point of connection serves as the information input 34 of the nonlinear converter 33. An output of a register of the second integrator 41 serves as the digital output 32 of the nonlinear converter 33.

The approximator 38 of the correction for the meridional minute length at the location of the vessel comprises an AND gate 46 whose first input 47 is connected to the output of the unit 37, while its second input 48 is electrically connected to the same output of the unit 37 through a series circuit composed of an n-digit counter 49, a decoder 50 and an OR gate 51.

In the embodiment under review, the plotter 31 comprises a magnetically conducting plate 52 mounted on a board (not shown). Arranged on the plate 52 is a Mercator map 53. Arranged on the Mercator map 53 is a picture frame 54 having at least three electromagnetic holdfast means 55. In the embodiment under review, the picture frame 54 is of a square shape and provided with four electromagnetic holdfast means 55 arranged at its corners. The size of the frame 54 along the latitude coordinate $\psi$ is selected to be 0.25 to $\frac{2}{3}$ of the length of the Mercator map 53. The integrating drives 29 and 30 are reversible step electromotors rigidly mounted on the picture frame 54 and connected to the outputs 27 and 28 of the frequency divider circuits 16 and 17, respectively.

Mounted on the frame 54 of the plotter 31 are drive screws 56 and 57 which are kinematically coupled to the step electromotors 29 and 30, respectively. The screw 57 is coupled to the step electromotor 30 through a pair of conical gears 58 and 59. The screws 56 and 57 support carriages 60 and 61. Mounted on the carriage 61 is a graphic marker 62. The end of the screw 56 rests on a bearing 63 mounted on the frame 54. The end of the screw 57 rests on a bearing 64 mounted on the carriage 60.

FIGS. 2a–2c present time plots of voltages. FIG. 2a is a diagram of pulses at the output of the unit 37, which correspond only to a whole number (an integer) of degrees of latitude $\psi_0$ of the standard parallel of the Mercator map. FIG. 2b is a diagram of pulses at the output of the AND gate 46 of the approximator 38. FIG. 2c is a time plot showing variations of the initial code equivalent of voltage across the register of the digital integrator 41 with the approximator 38 performing the correction.

The description of operation of the system for graphic representation of a vessel's position on the Mercator map in accordance with the invention will be preceded by some simplified theoretical considerations.

While keeping plot of the ship's position, her geographical coordinates $\psi$ and $\lambda$ are graphically indicated on the Mercator map. The length of one meridional minute is not a constant value because of the asphericity of the earth and depends on the ship's location.

The log measures the distance covered by the vessel in international nautical miles, one such mile being equal to 1,852 m. One international nautical mile is equal to the length of one meridional minute at a latitude of about 45°. Thus graphic plotting leads to an error in the determination of coordinates. The error varies from 0.2 percent of the distance covered by a vessel on the equator to 0.4 percent of that distance at a latitude of 75°.

To minimize the error, it is necessary to take into consideration the differences between the standard mile and its actual length at a given location. This operation is approximated by the following equations:

$$dS_\psi' = (1-\delta)dS_\psi \qquad (1)$$

and $$dS_\lambda' = (1-\delta)dS_\lambda \qquad (2)$$

$$\text{where } \delta = \begin{cases} 0 & \text{with } \psi \leq 10° \\ 0.000048\,(\psi-10°) & \text{with } \psi > 10° \end{cases} \qquad (3)$$

and where $\psi$ is the actual latitude of the vessel;

$dS_\psi$ is the distance in international nautical miles covered along the meridian; and $dS_\lambda$ is the distance in international nautical miles covered along the parallel.

If such an approximation is carried out, the plotting error is only within 0.2 percent of the distance covered by the vessel on the equator and 0.02 percent of that distance at 75° latitude; for all practical purposes, the error is independent of the elements involved in the Mercator mapping.

The asphericity of the earth also accounts for distortions of the actual scale of the Mercator map. However, the standard parallel is in the middle of the map sheet and the difference $(\psi - \psi_0)$ is normally less than 1°; thus the relative scale distortion is not greater than 0.006 percent between 40° and 50° and can be neglected.

To simplify the design of the nonlinear converter and approximator of the meridional minute length, the linear size of the plotter's frame is limited to $\frac{2}{3}$ of the latitudinal length of the Mercator map sheet.

This means that the standard parallel latitude $\psi_0$ may be substituted for $\psi$ in (3). The error in this case in negligibly small.

The system for calculation of the actual scale in the initial location of the vessel according to the invention also makes use of the expression $\cos\psi_0/\cos\psi_1$, $\psi_0$ and $\psi_1$ being set by the unit for successively setting the latitude of the standard parallel and the latitude of the initial position of the vessel. Thus the input data are of the same sign and magnitude.

Here is an example. Suppose $\psi_0 = 74°00'00''$ and $\psi_1 = 75°00'00''$; in the first case the error is $+10''$; in the second case it is $+10''$ and $-10''$. Thus the system according to the invention accounts for an actual scale determination error of 0.00784 percent. In the prototype systems, this figure is as high as 0.03499 percent, which means the system in accordance with the invention is about 4.5 times more accurate.

The reproduction of functions and the setting of the $\psi$ and $\psi_0$ angles by the system of this invention, as well as the fact that it takes into account the asphericity of the earth enable the system to raise the position finding accuracy to 0.25 percent of the distance covered by the vessel, as compared to 1 percent in the case of the prototype systems.

The system according to the invention operates as follows.

To plot the initial position of the vessel on the Mercator map 53 (FIG. 1), the latitude setting unit 37 sets the initial value $\psi_0$ and the setting unit 26 sets the scale $M_0$ of the standard parallel of the map 53. As this takes place, the computer 3 is off, zero code is entered in the register of the digital integrator 40, and the initial setting code is entered in the register of the digital integrator 41.

The setting of $\psi_0$ and $M_0$ is followed by a double readout of the $\psi_0$ code from the unit 37; first, the top or most significant digits are entered in the approximator 3, thereafter all the digits of the $\psi_0$ code are applied to the input 34 of the nonlinear converter 33 via the adder 35. As the top digits are being read out, the counter 49 counts the number of pulses (FIG. 2a) corresponding to the number of degrees in $\psi_0$; the decoder 50 then decodes the contents of the counter 49 (FIG. 1).

A train of correction pulses (FIG. 2b) is formed at the output of the approximator 38 (FIG. 1) by the AND gate 46 whose first input 47 receives the pulses (FIG. 2a), and whose second input 48 (FIG. 1) receives gate signals arriving from the output of the OR gate 51. The OR gate 51 so combines the outputs of the decoder 50 that the first ten outputs thereof are not used and neither is each third output beginning with the eleventh. This means the reproduction of (3), and "10" corresponds to the subtraction of 10° from $\psi_0$. Putting each third output of the decoder 50 out of operation makes it possible to set a desired pattern of the change of the initial contents of the register R, provided that R satisfies this condition:

$$R = \frac{3}{2}K^{-1} = \frac{3}{2} \cdot 0.000477^{-1}.$$

Thus the first gate is produced upon the arrival of ten pulses (FIG. 2a) from the unit 37 (FIG. 1); the next pulses bring about a stepwise change of R with the steepness $R \cdot \delta \cdot (\psi_0 - 10°)$.

The subtraction of $R \cdot \delta \cdot (\psi_0 - 10°)$ from R means a stepwise approximation (FIG. 3c) of a desired correction for the asphericity of the earth.

Following the correction, the code of this number: $R - R \cdot \delta \cdot (\psi_0 - 10°)$ is entered in the register of the integrator 41 (FIG. 1). A repeated readout of $\psi_0$ from the unit 37 produces a train of pulses, whereby the nonlinear converter 33 carries out trigonometrical transformation to produce the code of this number: $R \cdot (1-\delta)\cos\psi_0$. A control signal enters this code in the storage 13.

When introducing the initial geographical coordinates $\lambda_1$ and $\psi_1$, the frame 54 is arranged in a desired area of the map 53. The electromagnetic holdfast means 55 are brought into play to secure the frame 54 in place on the board 52. The graphic marker 62 is set at the point having the coordinates $\lambda_1$ and $\psi_1$. As previously, zero code and the R code are entered in the registers of the digital integrators 40 and 41, and the latitude setting unit 37 sets the value of $\psi_1$. Meanwhile, the approximator 38 is off.

As the value of $\psi_1$ is read out, a train of pulses is produced at the output of the unit 37; as previously, the nonlinear converter 33 performs trigonometric transformation; as a result, the code of $R \cdot \cos\psi_1$ is obtained and applied to the dividing inputs 22 and 23 of the frequency dividers 18 and 20, respectively.

To find the position of the vessel on the Mercator map 53, the computer 3 is switched on; the number of pulses passed via the adder 35 to the input 34 of the nonlinear converter 33 corresponds to the increment of the latitude due to the movement of the vessel. The code of R·Cos $\psi$ is reproduced at the output 32 of the nonlinear converter 33. The frequency of the pulses formed at the outputs 7 and 8 of the computer 3 corresponds to the longitudinal and latitudinal velocity components; the multipliers 9 and 10 multiply the number of these pulses by the constant value R·(1−$\delta$)·Cos $\psi_0$ stored by the storage 13. The dividers 18 and 20 divide the result of the multiplication by the code of R·Cos $\psi$; the dividers 19 and 21 divide the result of the multiplication by the scale denominator $M_0$ of the standard parallel of the map, set by the unit 26.

The result is a scale transformation of the repetition frequency of pulses produced at the outputs 7 and 8 of the computer 3, which is carried out according to the expression:

$$M = M_o \frac{\cos \psi_o}{\cos \psi} [1-\delta(\psi_o)].$$

The graphic marker 62 of the plotter 31 is set in motion by the pulses arriving from the outputs 27 and 28 of the dividers 16 and 17, respectively, which pulses are applied to the step electromotors 29 and 30. The motion of the marker 62 graphically represents latitude and longitude increments on the Mercator map 53.

Taking into account the initial position of the marker 62, having the coordinates $\lambda_1$ and $\psi_1$, the system according to the invention indicates the position of the vessel on the Mercator map with a high degree of accuracy.

We claim:

1. A system for graphic representation of a vessel's position on the Mercator map, comprising:

a veocity and drift angle sensor having a signal generated at a first output corresponding to the speed of the vessel, and a signal generated at a second output signal corresponding to the drift angle of the vessel;

a computer computing the longitudinal and latitudinal velocity components, and having a first input and a second input respectively connected to said first and second outputs of said velocity and drift angle sensor, a third input, and first and second outputs at which electric signals corresponding to longitudinal and latitudinal motion of the vessel are generated;

a heading sensor having an output connected to said third input of said computer;

a first multiplier having a first input connected to said first output of said computer, a second input and an output;

a second multiplier having a first input connected to said second output of said computer, a second input connected to said second input of said first multiplier, and an output;

a storage having an input and an output connected to said second inputs of said first and second multipliers;

a first frequency divider with a controlled division coefficient and having a first input connected to said output of said first multiplier, a second input and an output;

a second frequency divider with a controlled division coefficient and having a first input connected to said output of said first frequency divider, a second input and an output;

a third frequency divider with a controlled division coefficient and having a first input connected to said output of said second multiplier, a second input connected to said second input of said first frequency divider, and an output;

a fourth frequency divider with a controlled division coefficient and having a first input connected to said output of said third frequency divider, a second input connected to said second input of said second frequency divider, and an output;

a plotter indicating the position of the vessel on the Mercator map and electrically coupled to said second frequency divider and said fourth frequency divider;

a first integrating drive of said plotter having an input connected to said output of said second frequency divider;

a second integrating drive of said plotter having an input connected to said output of said fourth frequency divider;

a unit for setting the scale of the standard parallel of the Mercator map having an output connected to said second inputs of said second and fourth frequency dividers:

a nonlinear converter reproducing an electric signal in the form of trigonometric latitude functions, and having a correction input, an information input and an output connected to said input of said storage and to said second inputs of said first and third frequency dividers;

an adder having a first input, a second input and an output, said first input of said adder being connected to said second output of said computer and said output of said adder being connected to said information input of said nonlinear converter;

a latitude setting unit successively setting the latitude of the standard parallel and the latitude of the initial position of the vessel, and having an output connected to said second input of said adder; and an approximator, of the correction for the meridional minute length at the location of the vessel, having an input connected to said output of said latitude setting unit and an output connected to said correction input of said nonlinear converter.

2. A system as claimed in claim 1, wherein said nonlinear converter comprises:

a first digital integrator having a summing input connected to said information input of said nonlinear converter, a subtract input and a pulse output;

a second digital integrator having a subtract input, a summing input connected to said information input of said nonlinear converter, a pulse output connected to said subtract input of said first digital integrator, and a register output connectd to said output of said nonlinear converter; and an OR gate having a first input connected to said pulse output of said first digital integrator, a second input connected to said correction input of said nonlinear converter, and an output connected to said subtract input of said second digital integrator.

3. A device as claimed in claim 2, wherein said approximator comprises:

an AND gate having a first input, a second input and an output, said first input of said AND gate being connected to said input of said approximator, and said output of said AND gate being connected to said output of said approximator;

an OR gate having "n" inputs and an output connected to said second input of said AND gate;

a decoder having a plurality of outputs connected to respective inputs of said OR gate, and a plurality of inputs; and an n-digit counter having "n" outputs connected to respective inputs of said decoder, and an input connected to said first input of said approximator.

4. A device as claimed in claim 3, wherein said plotter comprises:

a board;

a magnetically conducting plate arranged on said board;

a Mercator map arranged on said magnetically conducting plate;

a picture frame holding said Mercator map on said board, arranged on said Mercator map and having a latitudinal length of 0.25 to ⅔ of the length of said Mercator map;

at least three electromagnetic holdfast means mounted on said picture frame; and wherein said integrating drives include two reversible step electromotors rigidly mounted on said picture frame and having inputs connected to said outputs of said respective frequency dividers, said inputs receiving a train of pulses arriving at a frequency corresponding to the product of the longitudinal and latitudinal velocity components and the actual scale of said Mercator map with due regard for the correction for the asphericity of the earth, the value of which correction is set by said approximator.

* * * * *